(12) United States Patent
Ishizawa et al.

(10) Patent No.: US 11,504,712 B2
(45) Date of Patent: Nov. 22, 2022

(54) FLUID DEVICE AND FLUID CONTROL SYSTEM

(71) Applicant: NIKON CORPORATION, Tokyo (JP)

(72) Inventors: Naoya Ishizawa, Saitama (JP); Taro Ueno, Tokyo (JP); Ryo Kobayashi, Kawasaki (JP); Tetsuomi Takasaki, Sagamihara (JP)

(73) Assignee: NIKON CORPORATION, Tokyo (JP)

( * ) Notice: Subject to any disclaimer, the term of this patent is extended or adjusted under 35 U.S.C. 154(b) by 385 days.

(21) Appl. No.: 16/772,093

(22) PCT Filed: Dec. 28, 2017

(86) PCT No.: PCT/JP2017/047282
§ 371 (c)(1),
(2) Date: Jun. 11, 2020

(87) PCT Pub. No.: WO2019/130558
PCT Pub. Date: Jul. 4, 2019

(65) Prior Publication Data
US 2021/0197195 A1 Jul. 1, 2021

(51) Int. Cl.
*B01L 3/00* (2006.01)

(52) U.S. Cl.
CPC ..... *B01L 3/502753* (2013.01); *B01L 2300/04* (2013.01); *B01L 2300/0681* (2013.01); *B01L 2300/0887* (2013.01); *B01L 2300/14* (2013.01)

(58) Field of Classification Search
CPC ......... B01L 2200/0684; B01L 2300/04; B01L 2300/0681; B01L 2300/0883;
(Continued)

(56) References Cited

U.S. PATENT DOCUMENTS

2010/0216193 A1 8/2010 Gomi et al.
2014/0370511 A1 12/2014 Katasho et al.
(Continued)

FOREIGN PATENT DOCUMENTS

EP 3385365 A1 10/2018
JP 2010/008058 A 1/2010
(Continued)

OTHER PUBLICATIONS

International Search Report for International Application No. PCT/JP2017/047282 dated Apr. 10, 2018; with English translation, 4 pages.
(Continued)

*Primary Examiner* — Jennifer Wecker
(74) *Attorney, Agent, or Firm* — Squire Patton Boggs (US) LLP

(57) ABSTRACT

A fluid device includes a substrate and a gas-liquid separating filter, the substrate has a flow path through which a solution flows, a reservoir, in which the solution is accommodated, connected to the flow path, an injection hole configured to connect the reservoir to the outside, and an air introduction hole branched off from the injection hole and connected to the outside, and the gas-liquid separating filter is disposed in a path of the air introduction hole, allows passage of a gas flowing through the air introduction hole, and prevents passage of a liquid flowing through the air introduction hole.

13 Claims, 7 Drawing Sheets

(58) Field of Classification Search
CPC ......... B01L 2300/0887; B01L 2300/14; B01L 2400/0487; B01L 3/50273; B01L 3/502753; G01N 35/08; G01N 37/00
See application file for complete search history.

(56) References Cited

U.S. PATENT DOCUMENTS

2018/0274019 A1   9/2018  Fukuzawa et al.
2019/0099752 A1   4/2019  Ichiki et al.

FOREIGN PATENT DOCUMENTS

| JP | 2013/130548 A | | 7/2013 | |
|---|---|---|---|---|
| JP | 2013/148591 A | | 8/2013 | |
| JP | 2013148591 A | * | 8/2013 | ............ B01L 3/5025 |
| WO | WO 2017/094674 A1 | | 6/2017 | |
| WO | WO 2017/213123 A1 | | 12/2017 | |

OTHER PUBLICATIONS

Written Opinion of the International Searching Authority for International Application No. PCT/JP2017/047282 dated Apr. 10, 2018; with English translation, 12 pages.
Hong, et al: "A nanoliter-scale nucleic acid processor with parallel architecture", Nature Biotechnology Letters; Apr. 2004 (online Mar. 14, 2004); vol. 22(4), pp. 435-439.
Notice of Reasons for Rejection dated Jul. 20, 2021 for Japanese Patent Application No. 2019-562686; with English translation, 9 pages.
Notice of Reasons for Rejection dated Nov. 16, 2021 for Japanese Patent Application No. 2019-562686; with English translation, 13 pages.

* cited by examiner

FLUID DEVICE AND FLUID CONTROL SYSTEM

CROSS-REFERENCE TO RELATED APPLICATION

This application is a 35 USC 371 national stage entry of International Patent Application No. PCT/JP2017/047282, filed Dec. 28, 2017.

TECHNICAL FIELD

The present invention relates to a fluid device and a solution supply system.

BACKGROUND ART

In recent years, development of micro-total analysis systems (μ-TAS) aiming at high speed, high efficiency and integration of tests in the in-vitro diagnostic field and ultra-miniaturization of testing equipment has attracted attention, and active research thereon is underway worldwide.

μ-TAS is advantageous in comparison with testing equipment in the related art in that measurement and analysis are possible using a small amount of sample, portability is possible, disposal with low costs is possible, and the like.

Further, this method has been attracting attention as highly useful when expensive reagents are used or when small amounts of multiple specimens are tested.

As a component in μ-TAS, a device including a flow path and a pump disposed on the flow path has been reported (Non-Patent Literature 1). In such a device, since the pump is operated when a plurality of solutions have been injected into the flow path, the plurality of solutions are mixed in the flow path.

CITATION LIST

Non-Patent Literature

Non-Patent Document 1

Jong Wook Hong, Vincent Studer, Giao Hang, W French Anderson and Stephen R Quake, Nature Biotechnology 22, 435-439 (2004)

SUMMARY OF INVENTION

According to a first embodiment, there is provided a fluid device including: a substrate and a gas-liquid separating filter, wherein the substrate is provided with: a flow path through which a solution flows; a reservoir, in which the solution is accommodated, and which is connected to the flow path; an injection hole configured to connect the reservoir to the outside; and an air introduction hole branching off from the injection hole and connected to the outside, wherein the gas-liquid separating filter is disposed partway along a path of the air introduction hole, allows passage of a gas flowing through the air introduction hole, and inhibits passage of a liquid flowing through the air introduction hole.

According to a second embodiment, there is provided a solution supply system including: the fluid device according to the first embodiment; and a negative pressure applying device configured to make the inside of the flow path have a negative pressure, wherein a solution previously filled into the reservoir is moved to the flow path from the reservoir.

According to a third embodiment, there is provided a solution supply system including: the fluid device according to the first embodiment; and a positive pressure applying device configured to apply a positive pressure to the reservoir via the air introduction hole, wherein the solution previously filled into the reservoir is moved to the flow path from the reservoir.

DESCRIPTION OF EMBODIMENTS

Figure 1:
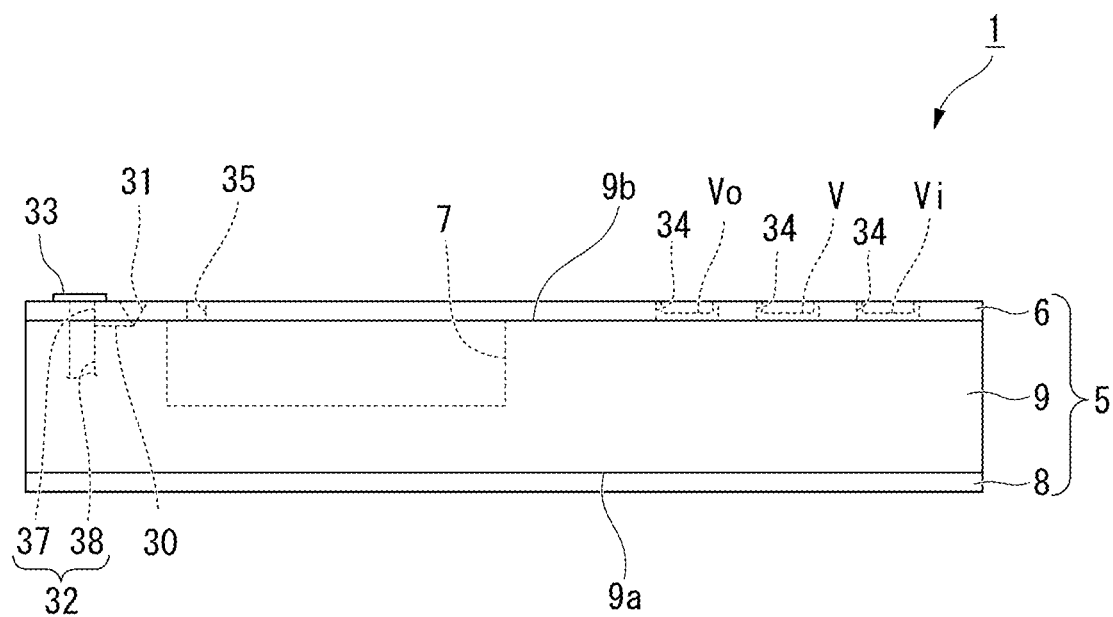
FIG. 1 is a front view of a fluid device of a first embodiment.

Hereinafter, embodiments of a fluid device, a reservoir supply system and a solution supply system will be described with reference to the accompanying drawings. Further, in the drawings used in the following description, features may be enlarged for convenience in order to understand the features easier, and dimensional ratios of components may not be the same as actual ones.

First Embodiment

Fluid Device

Figure 2:
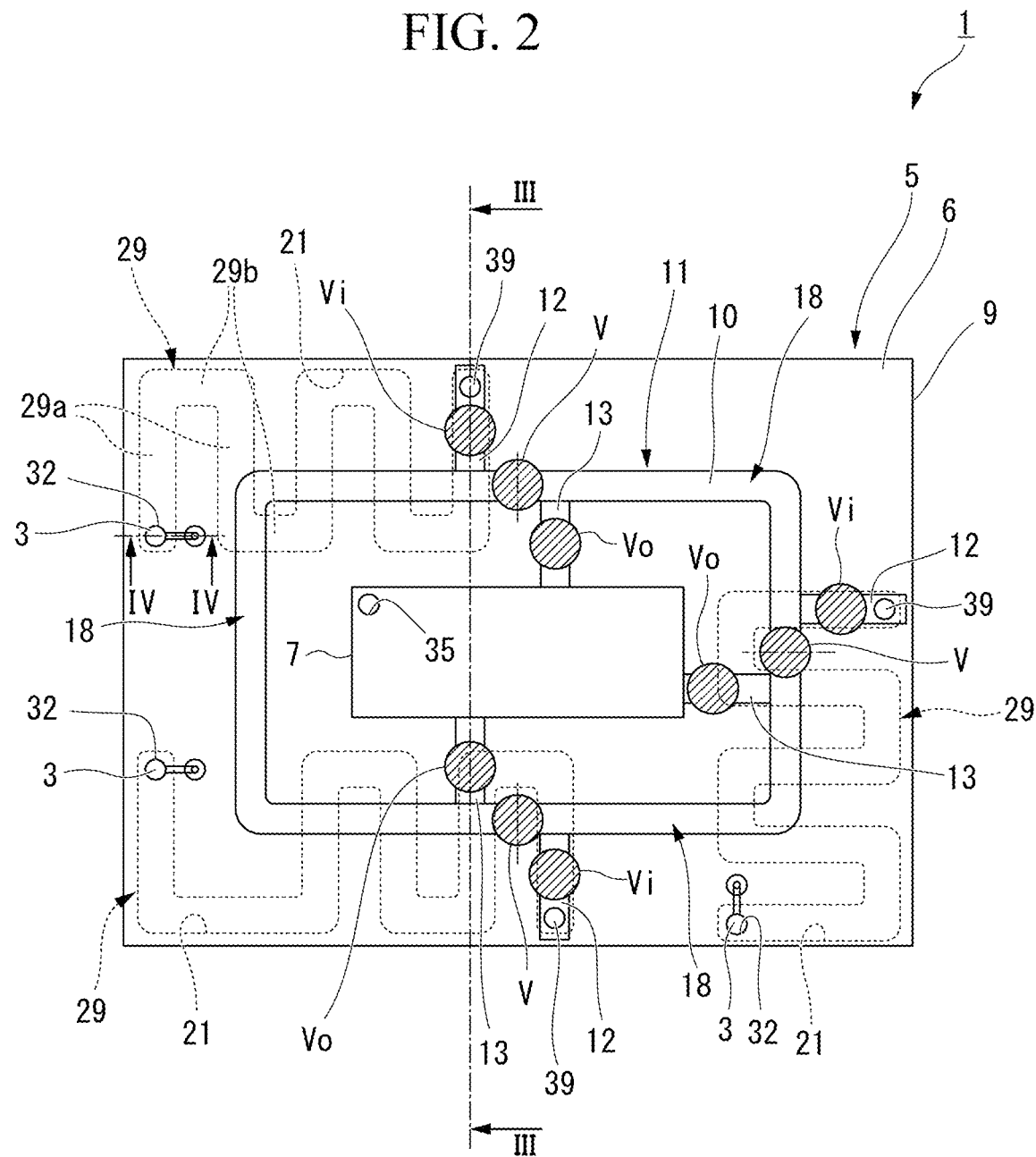
FIG. 2 is a plan view schematically showing the fluid device of the first embodiment.

FIG. 1 is a front view of a fluid device 1 of a first embodiment. FIG. 2 is a plan view schematically showing the fluid device 1. In FIG. 2, a transparent upper plate 6 is shown in a state in which respective parts disposed therebelow are seen therethrough.

The fluid device 1 of the embodiment includes a device configured to detect a sample material that is a detection target included in a specimen sample using an immunological reaction, an enzyme reaction, and the like. The sample material is a biomolecule such as a nucleic acid, DNA, RNA, a peptide, a protein, extracellular endoplasmic reticulum, or the like.

As shown in FIG. 2, the fluid device 1 includes a substrate 5, a gas-liquid separating filter 3 (not shown in FIG. 2), an injection hole closing film (a film) 33 (not shown in FIG. 2) and a plurality of valves V, Vi and Vo.

As shown in FIG. 1, the substrate 5 has an upper plate (a first base plate) 6, a lower plate (a third base plate) 8, and a base plate (a second base plate) 9. The upper plate 6, the lower plate 8 and the base plate 9 of the embodiment are formed of a resin material. The resin material that forms the upper plate 6, the lower plate 8 and the base plate 9 may be exemplified by polypropylene, polycarbonate, or the like. In addition, in the embodiment, the upper plate 6 and the lower plate 8 are formed of a transparent material. Further, the materials that form the upper plate 6, the lower plate 8 and the base plate 9 are not limited.

In the following description, the upper plate (for example, a lid section, an upper section or a lower section of a flow path, an upper surface or a bottom surface of the flow path) 6, the lower plate (for example, a lid section, an upper section or a lower section of the flow path, an upper surface or a bottom surface of the flow path) 8 and the base plate 9 are disposed along horizontal planes, the upper plate 6 is disposed above the base plate 9, and the lower plate 8 is disposed below the base plate 9. However, this merely defines a horizontal direction and an upward/downward direction for convenience of explanation, and does not limit the orientation when the fluid device 1 according to the embodiment is used.

The upper plate 6, the base plate 9 and the lower plate 8 are plate members extending in the horizontal direction. The upper plate 6, the base plate 9 and the lower plate 8 are stacked in sequence in the upward/downward direction. That is, the base plate 9 is disposed below the upper plate 6 and stacked on the upper plate 6. In addition, the lower plate 8 is stacked on the base plate 9 on a surface opposite to the upper plate 6 (a lower surface 9a).

Further, in the following description, a direction in which the upper plate 6, the base plate 9 and the lower plate 8 are stacked is simply referred to as a stacking direction. In the embodiment, the stacking direction is the upward/downward direction.

Figure 3:
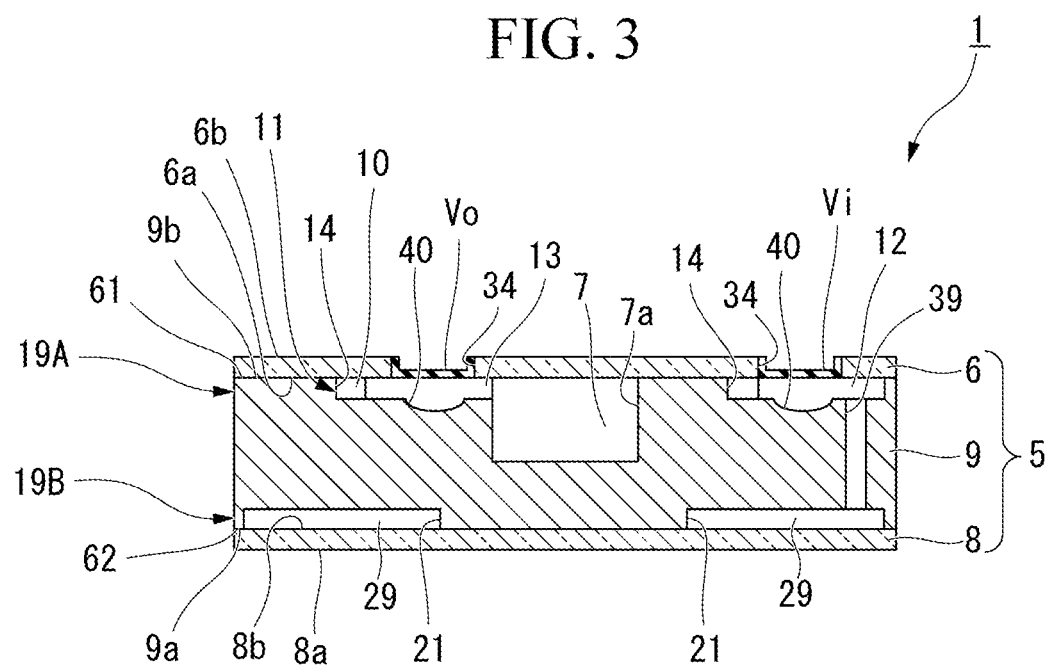
FIG. 3 is a cross-sectional view of the fluid device along line in FIG. 2.

FIG. 3 is a cross-sectional view of the fluid device 1 along line in FIG. 2.

As shown in FIG. 3, the upper plate 6 has an upper surface 6b and a lower surface 6a. The base plate 9 has an upper surface 9b and the lower surface 9a. Similarly, the lower plate 8 has an upper surface 8b and a lower surface 8a.

The lower surface 6a of the upper plate 6 faces and comes in contact with the upper surface 9b of the base plate 9 in the stacking direction. The lower surface 6a of the upper plate 6 and the upper surface 9b of the base plate 9 are joined to each other by a joining means such as adhesion or the like. The lower surface 6a of the upper plate 6 and the upper surface 9b of the base plate 9 constitute a first boundary surface (a first joining surface) 61. That is, the upper plate 6 and the base plate 9 are joined by the first boundary surface 61.

Similarly, the upper surface 8b of the lower plate 8 faces and comes in contact with the lower surface 9a of the base plate 9 in the stacking direction. The upper surface 8b of the lower plate 8 and the lower surface 9a of the base plate 9 are joined to each other by a joining means such as adhesion or the like. The upper surface 8b of the lower plate 8 and the lower surface 9a of the base plate 9 constitute a second boundary surface (a second joining surface) 62. That is, the base plate 9 and the lower plate 8 are joined by the second boundary surface 62.

The base plate 9 includes a reservoir layer 19B on the side of the lower surface 9a. A plurality of reservoirs 29 are provided on the reservoir layer 19B. In addition, the base plate 9 includes a reaction layer 19A on the side of the upper surface 9b. A flow path 11 and a waste liquid tank 7 are provided on the reaction layer 19A. That is, the plurality of reservoirs 29, the flow path 11 and the waste liquid tank 7 are provided on the base plate 9.

As shown in FIG. 2, when seen in the stacking direction, at least a part of the flow path 11 and at least a part of the reservoirs 29 are disposed to overlap each other. According to the embodiment, since the flow path 11 and the reservoirs 29 are disposed on the side of the upper surface 9b and the side of the lower surface 9a of the base plate 9, respectively, when seen in the stacking direction, the flow path 11 and the reservoirs 29 can be disposed to overlap each other. Accordingly, the fluid device 1 can be reduced in size.

As shown in FIG. 3, a plurality of groove sections 21 are formed in the lower surface 9a of the base plate 9. The groove sections 21 can also be expressed as linear cavities. Bottom surfaces of the plurality of groove sections 21 are disposed on substantially the same plane. That is, depths of the plurality of groove sections 21 are substantially the same as each other. Widths of the groove sections 21 in the longitudinal direction are almost uniform. In addition, widths of the plurality of groove sections 21 are substantially the same as each other.

The groove sections 21 have openings that open downward and are covered by the lower plate 8. The reservoirs 29 are formed in a space surrounded by the groove sections 21 and the lower plate 8. Accordingly, the reservoirs 29 are disposed between the base plate 9 and the lower plate 8.

The reservoirs 29 are spaces formed in tube shapes or cylindrical shapes surrounded by inner wall surfaces of the groove sections 21 formed in the lower surface 9a of the base plate 9 and the lower plate 8. A plurality of (more specifically, three) reservoirs 29 are formed on the substrate 5 of the embodiment. Solutions are accommodated in the reservoirs 29.

Further, in the embodiment, the case in which the reservoirs 29 are configured by forming the groove sections 21 in the base plate 9 and covering the openings of the groove sections 21 using the lower plate 8 has been described. However, the reservoirs 29 may be configured by covering the openings of the groove section formed in the lower plate 8 using the base plate 9.

The plurality of reservoirs 29 accommodate solutions independently from each other. The reservoirs 29 supply the accommodated solutions to the flow path 11. The reservoirs 29 are flow path type reservoirs. Accordingly, in each of the reservoirs 29, a length in a direction in which the solution flows toward the flow path 11 is greater than a width perpendicular to the length. In addition, in each of the reservoirs 29, a length in the direction in which the solution flows toward the flow path 11 is preferably greater than a depth perpendicular to the length and the width. Further, the size of the width in the reservoir 29 is preferably a size at which bubbles do not move over the solution.

In the embodiment, the widths of the plurality of reservoirs 29 are substantially the same as each other, for example, 1.5 mm. In addition, the depths of the plurality of reservoirs 29 are substantially the same as each other, for example, 1.5 mm. Shapes of flow path cross sections of the plurality of reservoirs 29 are exemplarily rectangular shapes. Capacities of the reservoirs 29 are set according to volumes of the accommodated solutions. For example, the lengths of the reservoirs 29 are set according to volumes of the accommodated solutions.

Further, these widths and depths of the reservoirs 29 are exemplary examples, and can be arbitrarily set to several μm to hundreds mm, for example, 1 μm to 999 mm or 0.01 μm or more and 100 mm or less, or the like, according to the size of the fluid device (the micro fluid device or the like) 1.

In addition, in the embodiment, while the configuration in which the plurality of reservoirs 29 have the same width and the same depth has been described as exemplary examples, there is no limitation thereto. The widths and depths of the plurality of reservoirs may be set to, for example, different values according to flow characteristics of the accommodated solutions. For example, when the solutions are introduced into the flow path by negative pressure suction from the plurality of reservoirs at the same time, the widths and depths may be set according to flow characteristics (flow resistances or the like) of the solutions for the reservoirs such that the different solutions are introduced into the flow path at the same timing.

As shown in FIG. 2, the reservoirs 29 are formed in a meander shape extending in a predetermined direction with linear cavities being repeated leftward and rightward. The reservoirs 29 are formed in a meander shape including a plurality of (in FIG. 4, five) first straight sections 29a disposed parallel to a predetermined direction (in FIG. 4, in the leftward/rightward direction), and second straight sections 29b in which connecting places of end portions of neighboring first straight sections 29a are repeatedly connected to each other on one end sides and the other end sides of the first straight sections 29a.

As shown in FIG. 3, supply holes 39 passing through in the stacking direction are formed in the base plate 9. The supply holes 39 connect the reservoirs 29 and the flow path 11. The solutions stored in the reservoirs 29 are supplied to the flow path 11 via the supply holes 39. That is, the reservoirs 29 are connected to the flow path 11 via the supply holes 39.

A plurality of groove sections 14 are formed in the upper surface 9b of the base plate 9. The groove sections 14 can be expressed as linear cavities. The groove sections 14 have openings that open upward and are covered by the upper plate 6. The flow path 11 is formed in the space surrounded by the groove sections 14 and the upper plate 6. Accordingly, the flow path 11 is disposed between the base plate 9 and the upper plate 6. The solutions flow to the flow path 11.

Further, in the embodiment, the case in which the flow path 11 is configured by forming the groove sections 14 in the base plate 9 and covering the openings of the groove sections 14 using the upper plate 6 has been described. However, the flow path 11 may be configured by covering the openings of the groove sections formed in the upper plate 6 using the base plate 9.

As shown in FIG. 2, the flow path 11 includes a circulation flow path 10, a plurality of (in the example of FIG. 2, three) introduction flow paths 12, and a plurality of (in the example of FIG. 2, three) discharge flow paths 13. The solutions are introduced into the flow path 11 from the reservoirs 29.

The circulation flow path 10 is configured in a loop shape when seen in the stacking direction. A plurality of (in the example of FIG. 2, three) quantitative valves V are provided in the middle of the circulation flow path 10. The plurality of quantitative valves V divide the circulation flow path 10 into a plurality of quantitative divisions 18. The plurality of quantitative valves V are disposed such that the divisions divided by the quantitative valves have predetermined volumes.

The introduction flow paths 12 are flow paths configured to introduce solutions into the quantitative divisions 18 of the circulation flow path 10. The introduction flow paths 12 are provided in the quantitative divisions 18 of the circulation flow path 10, respectively. The introduction flow paths 12 are connected to the supply holes 39 on one end side. In addition, the introduction flow paths 12 are connected to the circulation flow path 10 on the other end side. The introduction flow paths 12 are connected to the circulation flow path 10 in the vicinity of the quantitative valves V of the quantitative divisions 18.

The introduction flow paths 12 and the reservoirs 29 partially overlap each other when seen in the stacking direction, and are connected to each other via the supply holes 39 disposed on the overlapping portion. That is, the supply holes 39 are disposed in the portion in which the flow path 11 and the reservoirs 29 overlap each other in the stacking direction and extend in the stacking direction. Accordingly, the flow path 11 and the reservoirs 29 disposed on different surfaces of the base plate 9 can be connected over the shortest distance. As a result, pressure loss when the solutions are introduced into the flow path 11 from the reservoirs 29 can be reduced, and the solutions can be efficiently and quickly introduced into the flow path 11 from the reservoirs 29.

The discharge flow paths 13 are flow paths configured to discharge the solutions in the quantitative divisions 18 of the circulation flow path 10 to the waste liquid tank 7. The discharge flow paths 13 are provided in the quantitative divisions 18 of the circulation flow path 10, respectively. The discharge flow paths 13 are connected to the waste liquid tank 7 on one end side. In addition, the discharge flow paths 13 are connected to the circulation flow path 10 on the other end side. The discharge flow paths 13 are connected to the circulation flow path 10 in the vicinity of the quantitative valves V of the quantitative divisions 18. The quantitative divisions 18 are connected to the introduction flow paths 12 on one end side in the lengthwise direction, and connected to the discharge flow paths 13 on the other end side.

The introduction valves Vi are disposed in the middle of the introduction flow paths 12. Similarly, the waste liquid valves Vo are disposed in the middle of the discharge flow paths 13. Here, structures of the introduction valves Vi, the waste liquid valves Vo and the quantitative valves V will be described with reference to FIG. 3. Further, here, while the introduction valves Vi will be described on behalf of other valves, the other valves (the waste liquid valves Vo and the quantitative valves V) also have the same structure.

The introduction valves Vi are fixed to the upper plate 6. A plurality of valve holding holes 34 are formed in the upper plate 6. The upper plate 6 holds the introduction valves Vi in the valve holding holes 34. The introduction valves Vi are formed of an elastic material. A rubber, an elastomer resin, or the like are exemplary examples of the elastic material that can be employed in the introduction valves Vi. The upper plate 6 and the introduction valves Vi are integrally formed of different materials. In addition, the upper plate 6 and the introduction valves Vi are molded bodies that are integrally formed through two color molding, injection molding, insert molding, or the like.

A hemispherical cavity 40 is provided in the flow path 11 directly under the introduction valves Vi. The introduction valves Vi are elastically deformed downward and abut the cavity 40 to close the flow path 11. In addition, the introduction valves Vi are separated from the cavity 40 to open the flow path 11.

The waste liquid tank 7 is provided on the substrate 5 in order to allow discarding of the solutions in the flow path 11. The waste liquid tank 7 is connected to the flow path 11. As shown in FIG. 2, the waste liquid tank 7 is disposed in an internal region of the circulation flow path 10. Accordingly, the fluid device 1 can be reduced in size. In addition, as shown in FIG. 3, the waste liquid tank 7 is formed in a space surrounded by an inner wall surface of a concave section 7a provided on the side of the upper surface 9b of the base plate 9 and the upper plate 6 configured to cover the opening directed to a side above the concave section 7a.

The waste liquid tank 7 opens to the outside via an air hole (a device connecting hole) 35. The air hole 35 is formed in the upper plate 6. The air hole 35 is disposed directly above the waste liquid tank 7. The air hole 35 connects the waste liquid tank 7 to the outside. As described below, for example, a suction device (a negative pressure applying device) 56 can be connected to the air hole 35.

Figure 4:
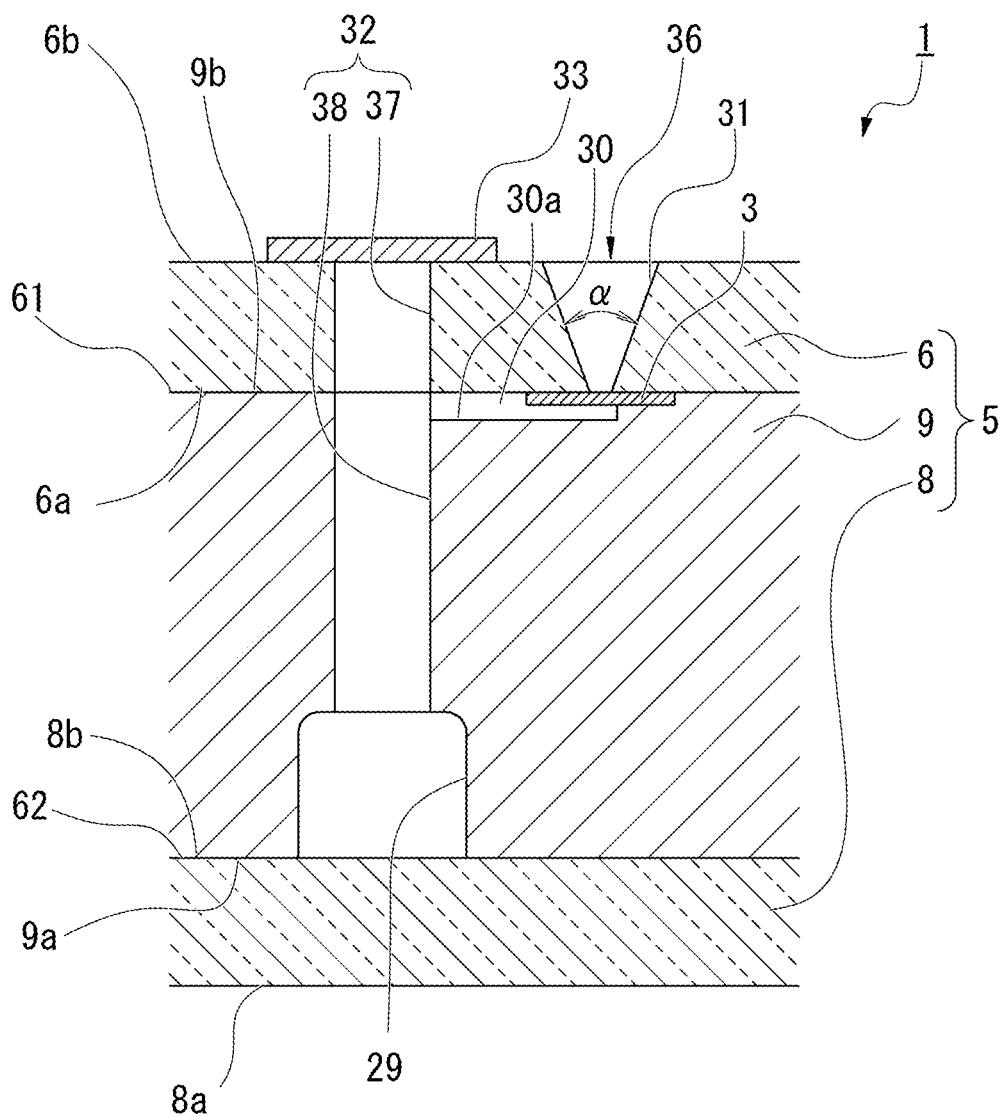
FIG. 4 is a cross-sectional view of the fluid device along line IV-IV in FIG. 2.

FIG. 4 is a cross-sectional view of the fluid device 1 along line Iv-Iv in FIG. 2.

A first through-hole 37 and a second through-hole 31 passing through in the stacking direction are formed in the upper plate 6. Meanwhile, a third through-hole 38 passing through in the stacking direction and connected to the first through-hole 37 is formed in the base plate 9. In addition, a connecting groove 30a is formed in the upper surface 9b of the base plate 9. The connecting groove 30a opens upward. One end of the connecting groove 30a overlaps the first through-hole 37 when seen in the stacking direction, and the other end of a connecting groove 30b overlaps the second through-hole 31.

The first through-hole 37 and the third through-hole 38 overlap and are made to communicate with each other when seen in the stacking direction. The first through-hole 37 and the third through-hole 38 constitute injection holes 32. In addition, the first through-hole 37 constitutes an opening of the injection holes 32.

The injection hole 32 is connected to the reservoir 29. That is, the injection hole 32 connects the reservoir 29 to the outside. The reservoir 29 is filled with the solutions via the injection hole 32. One injection hole 32 is provided with respect to each reservoir 29. That is, the same number of injection holes 32 are formed in the substrate 5 as the number of reservoirs 29. The injection hole 32 is connected to one ends of the reservoir 29 in the lengthwise direction. Further, the supply hole 39 is connected to the other ends of the reservoir 29 in the lengthwise direction.

Upper openings of the injection holes 32 are closed by the injection hole closing film (the film) 33. The injection hole closing film 33 is adhered to the upper surface 6b of the upper plate 6. The injection hole closing film 33 is adhered after the solutions are injected into the reservoirs 29 via the injection holes 32.

The second through-hole 31 is disposed adjacent to the first through-hole 37 when seen in the stacking direction. A cross-sectional shape of the second through-hole 31 in a direction perpendicular to the stacking direction is a circular shape. The second through-hole 31 extends in a tapered shape having a cross-sectional area that reduces in size from top to bottom (i.e., toward the base plate 9).

The connecting groove 30a can also be expressed as a linear cavity. The connecting groove 30a has an opening that opens upward and is covered by the upper plate 6. A connecting section 30 is configured in the space surrounded by the connecting groove 30a and the upper plate 6. Accordingly, the connecting section 30 is disposed between the base plate 9 and the upper plate 6. In other words, the connecting section 30 is provided on the first boundary surface 61.

Further, in the embodiment, the case in which the connecting section 30 is configured by forming the connecting groove 30a in the base plate 9 and covering the opening of the connecting groove 30a using the upper plate 6 has been described. However, the connecting section 30 may be configured by covering the opening of the groove section formed in the upper plate 6 using the base plate 9.

One end of the connecting section 30 is disposed in the opening of the second through-hole 31 on the side of the base plate 9, and the other end of the connecting section 30 is connected to a boundary section between the first through-hole 37 and the third through-hole 38. For this reason, the connecting section 30 connects the first through-hole 37 and the second through-hole 31.

The second through-hole 31 and the connecting section 30 constitute air introduction holes 36. That is, the air introduction holes 36 have the second through-hole 31 and the connecting section 30. The second through-hole 31 constitutes openings of the air introduction holes 36. The air introduction holes 36 are connected to the injection holes 32 in the connecting section 30. That is, the air introduction holes 36 branch off from the injection holes 32 and are connected to the outside. The air introduction holes 36 are formed in the substrate 5 to the same number as the reservoirs 29 and the injection holes 32.

The gas-liquid separating filter 3 is disposed in the path of the air introduction hole 36. That is, the fluid device 1 includes the gas-liquid separating filter 3. The gas-liquid separating filter 3 covers the opening of the second through-hole 31 on the lower side (on the side of the base plate 9). The gas-liquid separating filter 3 is sandwiched between the lower surface 6a of the upper plate 6 and the upper surface 9b of the base plate 9. The gas-liquid separating filter allows a gas flowing through the air introduction hole 36 to pass through a space between the second through-hole 31 and the connecting section 30, and prevent passage of the liquid flowing through the air introduction hole 36. A non-woven fabric or the like formed of a water repellent material such as a Poly Tetra Fluoro Ethylene (PTFE) resin or the like are exemplary examples of the gas-liquid separating filter 3. The gas-liquid separating filter 3 is preferably formed in a sheet shape for ease of incorporation into the fluid device. The fluid device is manufactured through a method of stacking and adhering plate-shaped or sheet-shaped substrate s in which grooves or concave sections are formed. Here, the substrate s are preferably melted and adhered to each other without using an adhesive agent in order to form them with very small dimensions. When the gas-liquid separating filter 3 is a flat sheet material, there is consistency in a manufacturing process of stacking and attaching the substrate s without using an adhesive agent.

According to the embodiment, even when the injection hole 32 is closed by the injection hole closing film 33, the air can be introduced into the reservoir 29 by forming the air introduction hole 36. For this reason, the air can be introduced from behind the solution filled into the reservoir 29, and the solution in the reservoir 29 can be moved to the flow path 11 via the supply hole 39.

According to the embodiment, the gas-liquid separating filter 3 provided in the path of the air introduction hole 36 is provided. The gas-liquid separating filter 3 prevents passage of a liquid while allowing passage of a gas. For this reason, the gas-liquid separating filter 3 does not prevent air from being introduced into the reservoir 29 via the air introduction hole 36. Meanwhile, the gas-liquid separating filter 3 can prevent the solution filled into the reservoir 29 from leaking outside via the air introduction hole 36.

According to the embodiment, the gas-liquid separating filter 3 is disposed on the first boundary surface 61, and covers the opening of the second through-hole 31 on the lower side (on the side of the base plate 9). For this reason, the gas-liquid separating filter 3 is not exposed to the outside. As a result, it is possible to prevent the gas-liquid separating filter 3 from being damaged during transportation or handling of the fluid device 1.

As described above, the second through-hole 31 is formed in a shape tapered from an upper side toward a lower side. Since the upper plate 6 is formed of a resin material, the second through-hole 31 is formed due to the convex section formed in the mold. The convex section needs have an increased strength with respect to the molten resin material flowing into the mold. For this reason, the convex section needs to have a sufficient size to secure sufficient rigidity, which makes passing through the second through-hole difficult. Meanwhile, the gas-liquid separating filter 3 is provided in the lower opening of the second through-hole 31. The gas-liquid separating filter 3 may be expensive. For this reason, the size of the gas-liquid separating filter 3 is preferably small.

According to the embodiment, the second through-hole 31 is formed in a tapered shape, a lower side of which is smaller. The second through-hole 31 has a cross-sectional area that is minimal at the lower opening (on the side of the base plate 9). For this reason, the gas-liquid separating filter 3 configured to cover the lower opening of the second through-hole 31 can be reduced, and an inexpensive fluid reservoir can be configured. In addition, the convex section provided in the mold to form the second through-hole 31 may be formed in a conical shape. Accordingly, a sufficient rigidity can be provided to the convex section, and the second through-hole 31 can be reliably formed. A taper angle α of the second through-hole 31 is preferably 5° or more in order to sufficiently increase a release property of the convex section in the mold.

In the embodiment, the flow path 11 is disposed between the upper plate 6 and the base plate 9, and the reservoirs 29 are disposed between the base plate 9 and the lower plate 8. That is, the flow path 11 is disposed on the first boundary surface 61, and the reservoirs 29 are disposed on the second boundary surface 62. However, at least one of the flow path 11 and the reservoirs 29 may be disposed on the first boundary surface 61. In addition, at least one of the flow path 11 and the reservoirs 29 may be disposed on the second boundary surface 62.

In the embodiment, the connecting section 30 of the air introduction hole 36 is disposed on the first boundary surface 61. However, the connecting section 30 may be disposed in the base plate 9. In addition, the connecting section 30 may be disposed on the second boundary surface 62.

Similarly, in the embodiment, the gas-liquid separating filter 3 is disposed on the first boundary surface 61. However, the location of the gas-liquid separating filter 3 is not limited as long as the gas-liquid separating filter 3 is disposed in the path of the air introduction holes 36. For example, the gas-liquid separating filter 3 may be disposed on the second boundary surface 62.

Solution Supply System

Next, a solution supply system 4 configured to supply solutions S to the flow path 11 from the reservoirs 29 in the fluid device 1 will be described with reference to FIG. 5.

Figure 5:
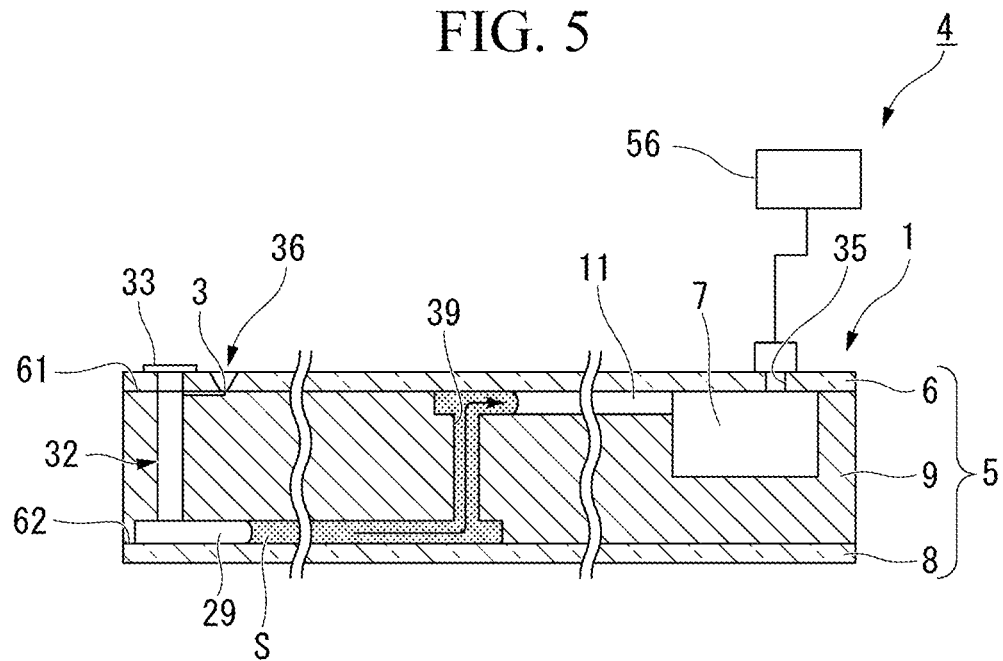
FIG. 5 is a schematic cross-sectional view of a solution supply system of the first embodiment.

FIG. 5 is a schematic cross-sectional view of the solution supply system 4. In FIG. 5, the supply holes 39, the reservoirs 29, the flow path 11 and the waste liquid tank 7 of the fluid device 1 are shown in series.

The solution supply system 4 moves the solutions previously filled into the reservoirs 29 to the flow path 11 from the reservoirs 29. The solution supply system 4 includes the fluid device 1, and a suction device (a negative pressure applying device, a pressure applying device) 56.

As shown in FIG. 5, the suction device 56 is connected to the air hole 35 of the fluid device 1. The suction device 56 causes the inside of the flow path 11 to reach a negative pressure via the air hole 35. In this way, the air hole 35 formed in the substrate 5 functions as a device connecting hole configured to connect a pressure applying device (in the embodiment, the suction device 56) configured to apply a negative pressure or a positive pressure to the flow path 11.

The solution supply system 4 moves the solutions S previously filled into the reservoirs 29 to the flow path 11 from the reservoirs 29. More specifically, the solution supply system 4 sequentially introduces the solutions S from the reservoirs 29 into the quantitative divisions 18 of the circulation flow path 10, respectively. Here, while a sequence of introducing the solutions S into one of the quantitative divisions 18 is described, the solutions S are also introduced into the other quantitative divisions 18 by performing the same sequence.

Opening/closing of the valves V, Vi and Vo when the solutions S are introduced into the quantitative divisions 18 will be described with reference to FIG. 2. First, the pair of quantitative valves V disposed at both sides in the lengthwise direction of the quantitative divisions 18 into which the solutions S are introduced are closed. Further, the waste liquid valves Vo of the discharge flow paths 13 connected to the corresponding quantitative divisions 18 are opened, and simultaneously, the waste liquid valves Vo of the other discharge flow paths 13 are closed. In addition, the introduction valves Vi of the introduction flow paths 12 connected to the corresponding quantitative divisions 18 are opened.

Next, the inside of the waste liquid tank 7 is suctioned to a negative pressure from the air hole 35 using the suction device 56. Accordingly, the solutions S in the reservoirs 29 are moved toward the flow path 11 via the supply holes 39. In addition, the air passing through the air introduction holes 36 is introduced behind the solutions S of the reservoirs 29. Accordingly, the solution supply system 4 introduces the solutions S accommodated in the reservoirs 29 to the quantitative divisions 18 of the circulation flow path 10 via the supply holes 39 and the introduction flow paths 12.

According to the embodiment, the gas-liquid separating filter 3 is provided in the path of the air introduction holes 36. For this reason, even when a positive pressure is applied to the air hole 35 due to an erroneous operation or the like of the suction device 56 connected to the air hole 35, it is possible to prevent the solutions from leaking from the air introduction holes 36.

Variant of Solution Supply System

Next, a solution supply system 104 of a variant will be described with reference to FIG. 6. Further, components the same as in the above-mentioned embodiment are designated by the same reference signs and description thereof will be omitted.

Figure 6:
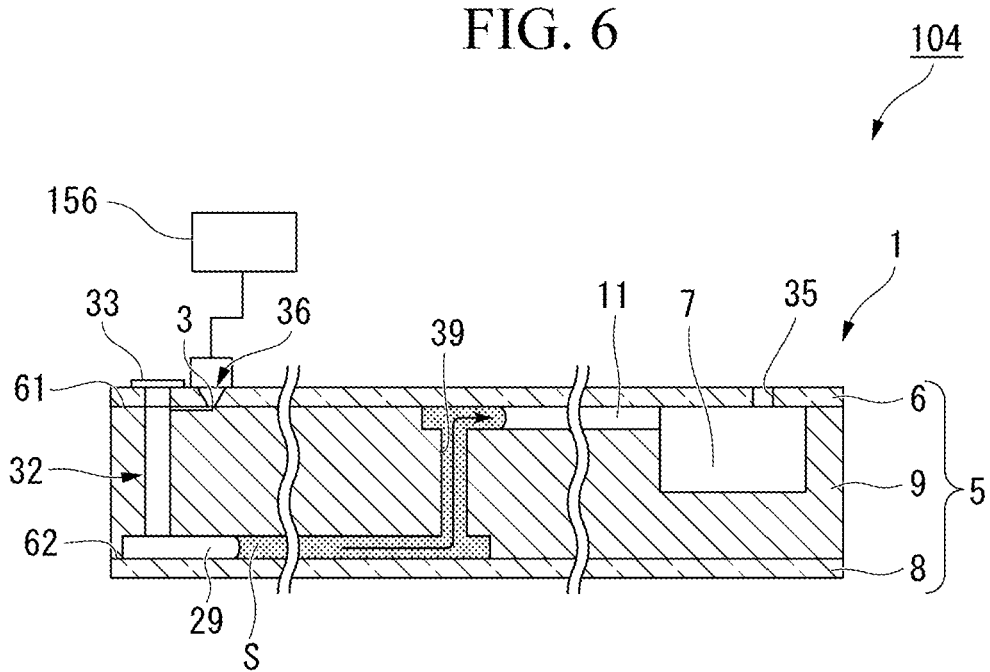
FIG. 6 is a schematic cross-sectional view of a solution supply system of a variant of the first embodiment.

FIG. 6 is a schematic cross-sectional view of the solution supply system 104 of the variant. In FIG. 6, the supply holes 39, the reservoirs 29, the flow path 11 and the waste liquid tank 7 of the fluid device 1 are shown in series.

Like the above-mentioned embodiment, the solution supply system 104 moves the solutions S previously filled into the reservoirs 29 to the flow path 11 from the reservoirs 29. More specifically, the solution supply system 104 sequentially introduces the solutions S into the quantitative divisions 18 of the circulation flow path 10 from the reservoirs 29, respectively.

The solution supply system 104 moves the solutions previously filled into the reservoirs 29 to the flow path 11 from the reservoirs 29. The solution supply system 104 includes the fluid device 1, and a positive pressure applying device (a pressure applying device) 156.

The positive pressure applying device 156 is connected to the air introduction holes 36 of the fluid device 1. The positive pressure applying device 156 applies a positive pressure to the reservoirs 29 via the air introduction holes 36. In addition, in the solution supply system 104 of the variant, the air hole 35 that opens to the waste liquid tank 7 is open to the outside.

Like the above-mentioned embodiment, first, the pair of quantitative valves V disposed on both sides in the lengthwise direction of the quantitative divisions 18 into which the solutions S are introduced are closed. Further, the waste liquid valves Vo of the discharge flow paths 13 connected to the corresponding quantitative divisions 18 are opened, and simultaneously, the waste liquid valves Vo of the other discharge flow paths 13 are closed. In addition, the introduction valves Vi of the introduction flow paths 12 connected to the corresponding quantitative divisions 18 are opened.

The positive pressure applying device 156 applies a positive pressure to the reservoirs 29 via the air introduction holes 36. Accordingly, the solutions S in the reservoirs 29 move toward the flow path 11 via the supply holes 39. In addition, the air in the flow path 11 and the waste liquid tank 7 is exhausted to the outside via the air hole 35. Accordingly, the solution supply system 104 introduces the solutions S accommodated in the reservoirs 29 to the quantitative divisions 18 of the circulation flow path 10 via the supply holes 39 and the introduction flow paths 12.

Further, in the embodiment, the positive pressure applying device 156 is connected to the air introduction holes 36. However, the positive pressure applying device 156 may be connected to the openings of the injection holes 32, from which the injection hole closing film 33 is separated. In this case, the openings of the air introduction holes 36 are preferably closed by a film or the like.

Solution Mixing System

Next, the solution mixing system configured to mix the solutions supplied to the flow path of the fluid device 1 will be described with reference to FIG. 2. The solution mixing system has the fluid device 1, and a control part (not shown) configured to control a pump (not shown) that circulates the solutions in the flow path 11 of the fluid device 1.

First, in a state in which the solutions are introduced into the quantitative divisions 18 of the circulation flow path 10 as described above, respectively, the waste liquid valves Vo and the introduction valves Vi are closed, and the quantitative valves V are open. Further, the solutions in the circulation flow path 10 are delivered and circulated using the pump (not shown). In the solutions that circulate through the circulation flow path 10, due to interaction (friction) between the flow path wall surface in the flow path and the solutions, a flow velocity around the wall surface is slow, and a flow velocity at the center of the flow path is fast. As a result, since the flow velocity of the solutions can be distributed, mixing and reaction of the solutions are promoted.

Second Embodiment

Figure 7:
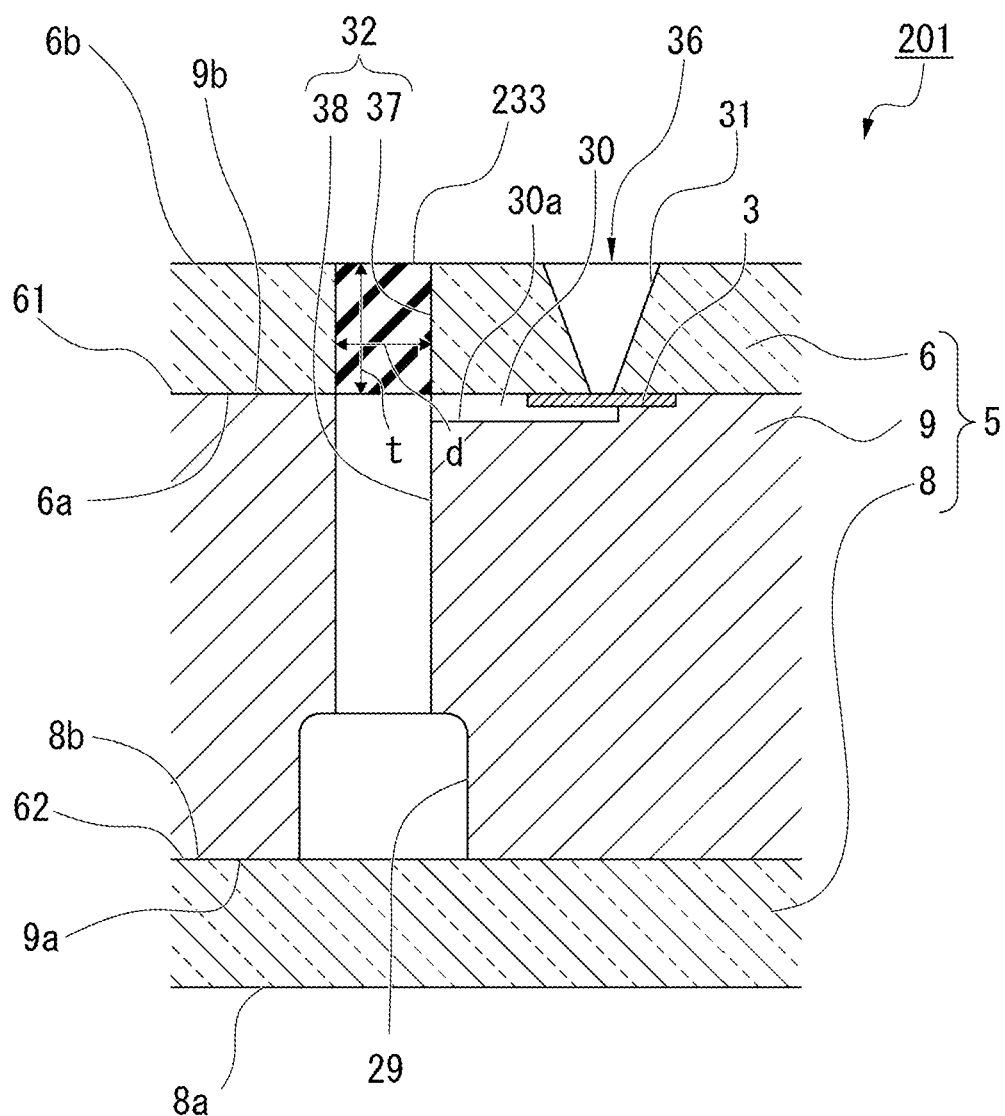
FIG. 7 is a partial cross-sectional view of a fluid device of a second embodiment.

FIG. 7 is a partial cross-sectional view of a fluid device 201 of the second embodiment.

The fluid device 201 of the embodiment is distinguished from the fluid device 1 of the above-mentioned first embodiment mainly in that a septum 233 configured to close the openings of the injection holes 32 is provided. Further, the components of the same aspect as the above-mentioned embodiment are designated by the same reference signs and description thereof will be omitted.

The fluid device 201 of the embodiment includes the substrate 5, the gas-liquid separating filter 3, the plurality of valves V, Vi and Vo, and the septum 233. Further, in FIG. 7, illustration of the valves V, Vi and Vo is omitted.

Like the above-mentioned embodiment, the substrate 5 has the upper plate 6, the base plate 9, and the lower plate 8. In addition, the injection holes 32, the air introduction holes 36, the reservoirs 29, the supply holes 39, the flow path 11 and the waste liquid tank 7 are provided on the substrate 5. Further, in FIG. 7, illustration of the supply holes 39, the flow path 11 and the waste liquid tank 7 is omitted.

In the embodiment, the septum 233 is fixed to the first through-hole 37 formed in the upper plate 6. The septum 233 closes the openings of the injection holes 32. The septum 233 is formed of an elastic material. A rubber, an elastomer resin, and the like, are exemplary examples of an elastic material that is employable in the septum 233. The upper plate 6 and the septum 233 are molding bodies integrally formed through two color formation, injection molding, insert molding, or the like.

As described above, in addition to the septum 233, the valves V, Vi and Vo are integrally provided on the upper plate 6. The septum 233 and the valves V, Vi and Vo may be formed of the same material. In this case, the upper plate 6, the septum 233 and the valves V, Vi and Vo can be integrally formed through two color formation, injection molding, insert molding, or the like, using two resin materials.

The septum 233 may be referred to as an elastic cap member. An inner circumferential surface of a hole section of the septum 233 formed by penetrating the hollow needle adheres airtightly to an outer circumferential surface of the hollow needle due to elastic deformation of the septum 233. Accordingly, the solutions can be injected into the reservoirs 29 via the hollow section of the hollow needle. In addition, the septum 233 airtightly closes the hole, through which the hollow needle is inserted, by removing the hollow needle. For this reason, even when the fluid device 201 is vertically operated after the solutions are injected into the reservoirs 29, the solutions are not leaked from the openings of the injection holes 32. In particular, the reservoirs 29 of the embodiment have a flow path shape. For this reason, since bubbles are interposed between the septum 233 and the solutions, the solutions can be more stably held in the reservoirs 29 while the solutions do not reach the septum 233.

According to the fluid device 201 and the reservoir supply system 2 of the embodiment, by inserting a hollow needle of a syringe into the septum 233, it is possible to easily fill the reservoirs 29 with the solutions S and seal the reservoirs 29. In addition, the hollow needle can be inserted into and removed from the septum 233 a plurality of times. Accordingly, the solutions S can also be additionally injected into the reservoirs 29.

According to the fluid device 201 of the embodiment, since the openings of the injection holes 32 are closed by the septum 233, there is no need to provide the injection hole closing film 33 (see FIG. 4) as shown in the first embodiment. For this reason, a work process when the reservoirs 29 are filled with the solution can be simplified.

The septum 233 has a circular shape when seen in the stacking direction. An external form of the septum 233 coincides with the first through-hole 37. That is, the first through-hole 37 has a circular shape when seen in the stacking direction.

A diameter d of the septum 233 is preferably 1.5 mm or more. When the diameter d of the septum 233 1.5 mm or more, two color formation of the septum 233 with respect to the first through-hole 37 can be easily performed.

A dimension (thickness) t of the septum 233 in the stacking direction is set according to a withstand pressure required for the septum 233 and the diameter of the hollow needle that passes through the septum 233 to form the hole section in the septum 233. Further, all of diameters d of the septa 233 having different dimensions tin the stacking direction, which will be described, are 1.5 mm or more.

When the dimension t of the septum 233 in the stacking direction is 1.0 mm or more, a withstand pressure of 100 kPa or more can be secured in the case in which an outer diameter of the hollow needle is 0.46 mm (26 G (gauge)) or less, and a withstand pressure of 200 kPa or more can be secured in the case in which the outer diameter of the hollow needle is 0.41 mm (27 G (gauge)) or less.

In addition, when the dimension t of the septum 233 in the stacking direction is 1.5 mm or more, a withstand pressure of 200 kPa or more can be secured in the case in which the outer diameter of the hollow needle is 0.46 mm (26 G (gauge)) or less.

Further, these withstand pressure designs were derived from evaluation experiments by the inventors of the present invention.

Variant 1 of Septum

Figure 8A:
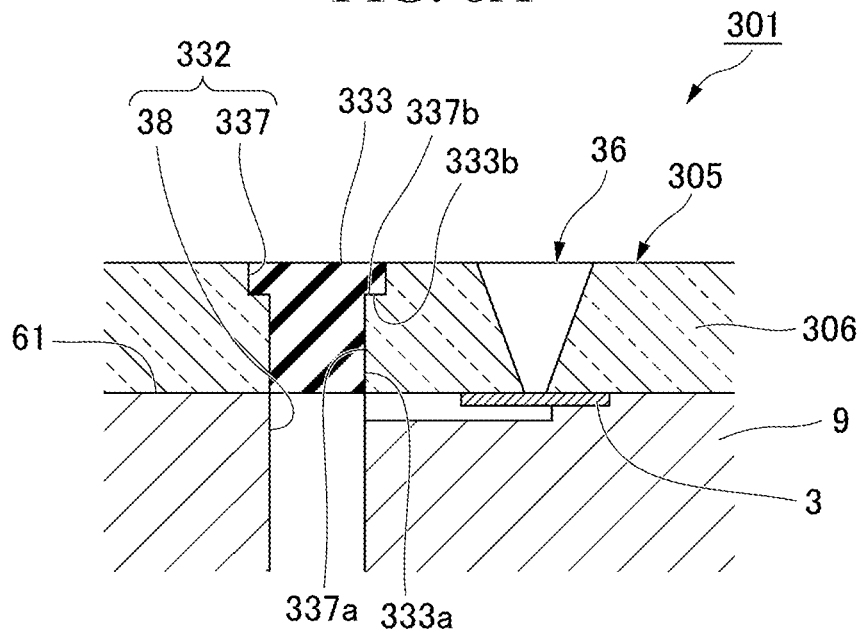
FIG. 8A is a partial cross-sectional view of a fluid device including a septum of Variant 1 that can be employed in the second embodiment.

FIG. 8A is a partial cross-sectional view of a fluid device 301 including a septum 333 of Variant 1 that is employable in the second embodiment. Further, the components of the same aspect as the above-mentioned embodiment are designated by the same reference signs and description thereof will be omitted.

The fluid device 301 of the variant includes a substrate 305 and the septum 333. An injection hole 332 and the air introduction holes 36 are formed in the substrate 305. The injection hole 332 connects the reservoirs 29 (omitted in FIG. 8A) to the outside. The air introduction holes 36 are branched off from the injection hole 332 and connected to the outside.

The substrate 305 has an upper plate 306, the base plate 9 and the lower plate 8 (omitted in FIG. 8A). A first through-hole (a through-hole) 337 configured to hold the septum 333 is formed in the upper plate 306. The first through-hole 337 is connected to the third through-hole 38 formed in the base plate 9. The first through-hole 337 and the third through-hole 38 constitute the injection hole 332. In addition, the first through-hole 337 constitutes an opening of the injection hole 332.

The first through-hole 337 has a circular shape when seen in the stacking direction. A convex section 337a protruding toward an inward side of the first through-hole 337 is formed on an inner circumferential surface of the first through-hole 337. An upper end of the convex section 337a is disposed below an upper end of the first through-hole 337. In addition, a lower end of the convex section 337a coincides with a lower end of the first through-hole 337. The convex section 337a is provided on the entire circumference of the inner circumferential surface of the first through-hole 337. A protrusion height of the convex section 337a is uniform in a circumferential direction. Accordingly, the shape of the first through-hole 337 inside the convex section 337a is a circular shape when seen in the stacking direction.

The septum 333 is fixed to the inner circumferential surface of the first through-hole 337. A concave section 333a into which the convex section 337a is fitted is formed in the septum 333. Like the above-mentioned embodiment, the septum 333 and the upper plate 306 are molding bodies that are integrally formed through two color formation, injection molding, insert molding, or the like. As an example, since the septum 333 is formed on the first through-hole 337 of the upper plate 306 after the upper plate 306 is formed, the concave section 333a into which the convex section of the convex section 337a is fitted is formed in the septum 333.

The convex section 337a of the first through-hole 337 has a stepped surface 337b that is directed upward. Meanwhile, the septum 333 has a facing surface 333b that constitutes the concave section 333a and is directed downward. The stepped surface 337b and the facing surface 333b face and come into contact with each other in the stacking direction. For this reason, the stepped surface 337b can prevent the septum 333 from moving downward. That is, according to the variant, since the convex section 337a is fitted into the concave section 333a, the stepped surface 337b prevents downward movement of the septum 333, and functions as a retainer of the septum 333.

Variant 2 of Septum

Figure 8B:
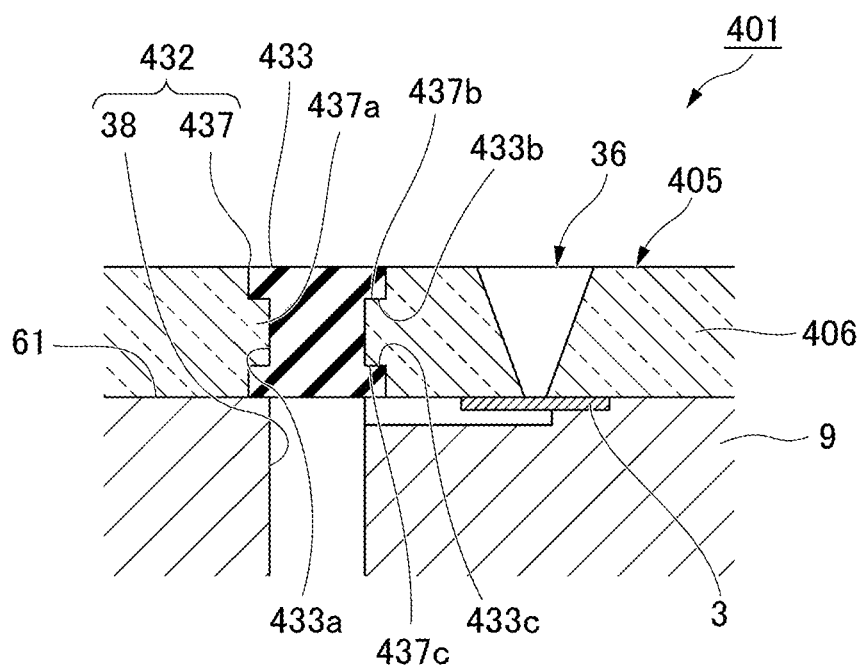
FIG. 8B is a partial cross-sectional view of a fluid device including a septum of Variant 2 that can be employed in the second embodiment.

FIG. 8B is a partial cross-sectional view of fluid device 401 including a septum 433 of Variant 2 that is employable in the second embodiment. Further, the components of the same aspect as the above-mentioned embodiment are designated by the same reference signs and a description thereof will be omitted.

The fluid device 401 of the variant includes a substrate 405 and the septum 433. An injection hole 432 and the air introduction holes 36 are formed in the substrate 405. The injection hole 432 connects the reservoirs 29 (omitted in FIG. 8A) to the outside. The air introduction holes 36 are branched off from the injection hole 432 and connected to the outside.

The substrate 405 has an upper plate 406, the base plate 9 and the lower plate 8 (omitted in FIG. 8B). A first through-hole (a through-hole) 437 configured to hold the septum 433 is formed in the upper plate 406. The first through-hole 437 is connected to the third through-hole 38 formed in the base plate 9. The first through-hole 437 and the third through-hole 38 constitute the injection hole 432. In addition, the first through-hole 437 constitutes the opening of the injection hole 432. The injection hole 432 connects the reservoirs 29 (omitted in FIG. 8B) to the outside.

A convex section 437a protruding toward an inward side of the first through-hole 437 is provided on the inner circumferential surface of the first through-hole 437. An upper end of the convex section 437a is disposed below an upper end of the first through-hole 437. In addition, a lower end of the convex section 437a is disposed above a lower end of the first through-hole 437. In addition, a concave section 433a into which the convex section 437a is fitted is formed in the septum 433.

The convex section 437a of the first through-hole 437 has a first stepped surface 437b directed upward, and a second stepped surface 437c directed downward. Meanwhile, the septum 433 has a first facing surface 433b directed downward, and a second facing surface 433c directed upward. The first stepped surface 437b and the first facing surface 433b face and come into contact with each other in the stacking direction. Similarly, the second stepped surface 437c and the second facing surface 433c face and come into contact with each other in the stacking direction. For this reason, the first stepped surface 437b and the second stepped surface 437c restrict movement of the septum 433 in the upward/downward direction. That is, according to the variant, since the convex section 437a is fitted into the concave section 433a, the first stepped surface 437b and the second stepped surface 437c restrict movement of the septum 433 in the upward/downward direction, and function as a retainer of the septum 433.

Hereinabove, although various embodiments of the present invention have been described, the configurations, combinations thereof, and the like, of the embodiments are exemplary examples, and additions, omission, substitutions and other modifications of the configurations may be made without departing from the spirit of the present invention. In addition, the present invention is not limited to the embodiment.

REFERENCE SIGNS LIST 1, 201, 301, 401 Fluid device
3 Gas-liquid separating filter
4, 104 Solution supply system
5, 305, 405 Substrate
6 Upper plate (first base plate)
7 Waste liquid tank
8 Lower plate (third base plate)
9 Base plate (second base plate)
11 Flow path
29 Reservoir
30 Connecting section
31 Second through-hole
32, 332, 432 Injection hole
33 Injection hole closing film (film)
35 Air hole (device connecting hole)
36 Air introduction hole
37, 337, 437 First through-hole
56 Suction device (negative pressure applying device, pressure applying device)
61 First boundary surface (first joining surface)
62 Second boundary surface (second joining surface)
156 Positive pressure applying device (pressure applying device)
233, 333, 433 Septum
S Solution

What is claimed is:

1. A fluid device comprising:
a substrate and a gas-liquid separating filter, wherein the substrate comprises a flow path through which a solution flows, and wherein the substrate additionally comprises a first base plate having a first through-hole that constitutes a first opening of an injection hole and a second through-hole having a second opening of an air introduction hole, and wherein a second base plate is stacked on the first base plate and are joined to each other on a first joining surface;
a reservoir, which is connected to the flow path; the injection hole having a reservoir connection portion connected to the reservoir at one end and the first opening at the other end; and
the air introduction hole having an injection hole connection portion connected between the first opening and the reservoir connection portion at one end and the second opening at the other end, wherein the gas-liquid separating filter is located between the injection hole connection portion and the second opening such that the gas-liquid separating filter is disposed on the first joining surface and covers an opening of the second through-hole that faces the first base plate.

2. The fluid device according to claim 1, wherein the substrate comprises a connecting section configured to connect the first through-hole and the second through-hole and the injection hole connection portion is formed on the first joining surface.

3. The fluid device according to claim 2 wherein the second through-hole extends in a tapered shape having a cross-sectional area that reduces in size toward the second base plate.

4. The fluid device according to claim 2, wherein the substrate has a third base plate stacked on the second base plate on a surface opposite to the first base plate, the second base plate and the third base plate are joined at a second joining surface, and at least one of the flow path and the reservoir is disposed on the second joining surface.

5. The fluid device according to claim 4, wherein the reservoir has a length in a direction in which the solution flows toward the flow path, which is larger than a width perpendicular to the length.

6. The fluid device according to claim 5, wherein the reservoir has the length in a direction in which the solution flows, which is larger than a depth perpendicular to the length and the width.

7. The fluid device according to claim 6, wherein a size of the width in the reservoir is set such that bubbles do not move past the solution.

8. The fluid device according to claim 1, wherein a device connecting hole that connects a pressure applying device configured to apply a negative pressure or a positive pressure to the flow path is formed in the substrate.

9. The fluid device according to claim 1, wherein a waste liquid tank connected to the flow path is provided on the substrate.

10. The fluid device according to claim 1, wherein a septum configured to close the first opening of the injection hole is provided.

11. The fluid device according to claim 1, wherein a film configured to close the first opening of the injection hole is provided.

12. A fluid control system comprising:
the fluid device according to claim 1; and
a negative pressure applying device configured to make the inside of the flow path have a negative pressure,
wherein the solution previously filled into the reservoir is moved to the flow path from the reservoir.

13. A fluid control system comprising:
the fluid device according to claim 1; and
a positive pressure applying device configured to apply a positive pressure to the reservoir via the air introduction hole,
wherein the solution previously filled into the reservoir is moved to the flow path from the reservoir.

* * * * *